United States Patent
Wu (10) Patent No.: US 7,822,380 B2
(45) Date of Patent: Oct. 26, 2010

(54) INTERFERENCE PREVENTION FOR RECEIVER SYSTEM INCORPORATING RDS-TMC RECEIVER AND FM MODULATOR

(75) Inventor: Chun-Hsien Wu, Torrance, CA (US)

(73) Assignee: Alpine Electronics, Inc., Tokyo (JP)

( * ) Notice: Subject to any disclaimer, the term of this patent is extended or adjusted under 35 U.S.C. 154(b) by 1028 days.

(21) Appl. No.: 11/580,723

(22) Filed: Oct. 13, 2006

(65) Prior Publication Data
US 2008/0090515 A1   Apr. 17, 2008

(51) Int. Cl.
*H04B 7/00* (2006.01)
(52) U.S. Cl. .................. 455/3.01; 455/41.3; 455/69; 455/161.2; 455/183.2; 455/186.1
(58) Field of Classification Search .................. None
See application file for complete search history.

(56) References Cited

U.S. PATENT DOCUMENTS 6,173,165 B1   1/2001   Ruhl et al.
6,493,546 B2 *  12/2002   Patsiokas ................. 455/277.1
2003/0215024 A1  11/2003   Miyahara
2007/0141979 A1*  6/2007   Brey ......................... 455/3.06
2008/0076352 A1*  3/2008   Der ........................ 455/3.01 X

FOREIGN PATENT DOCUMENTS

JP          11-331000        11/1999
JP          2001-358599      12/2001

* cited by examiner

*Primary Examiner*—Philip J Sobutka
(74) *Attorney, Agent, or Firm*—Muramatsu & Associates (57) ABSTRACT

A method and apparatus prevents interference between a radio signal from RDS-TMC service provider for receiving traffic and travel data by an RDS-TMC receiver and a radio signal for transmitting audio, text, or image data from an FM modulator. The method includes the steps of starting an operation of the receiver system, stopping an operation of the FM modulator while keeping operation of the RDS-TMC receiver, examining whether an RDS-TMC signal from a service provider is available at a current location, receiving the RDS-TMC signal and retrieving RDS-TMC data therefrom, sending the retrieved RDS-TMC data to an audio/video system, and starting the operation of the FM modulator while allowing to output an FM signal from the FM modulator at allowable frequency bands which are outside of a blocked range to send data to the audio/video system.

18 Claims, 8 Drawing Sheets

INTERFERENCE PREVENTION FOR RECEIVER SYSTEM INCORPORATING RDS-TMC RECEIVER AND FM MODULATOR

FIELD OF THE INVENTION

This invention relates to a method and apparatus for receiving radio signals, and more particularly, to a method and apparatus for preventing interference between a radio signal for receiving traffic and travel data by an RDS-TMC receiver and a radio signal for transmitting audio, text, or image data from an FM modulator.

BACKGROUND OF THE INVENTION

Traffic service providers now broadcast traffic and travel information through radio transmission to help drivers to safely and efficiently travel. Although such services are limited today to city areas and along major freeways, it is expected that such traffic information service will cover most of the entire country in the near future. A typical example of such a traffic information service is RDS-TMC (Radio Data System-Traffic Message Channel) which transmits traffic and travel information of event, status and location to receivers via FM transmission.

Since the RDS-TMC services provide useful information or traffic and travel, an RDS-TMC receiver is preferably incorporated in a vehicle in combination with a navigation system. As is known in the art, a navigation system calculates an efficient route to a destination and guides a driver to the destination through the calculated route. In such a case, typically, an audio/video system of a vehicle is used to produce sounds and images for the RDS-TMC receiver and the navigation system.

Figure 1:
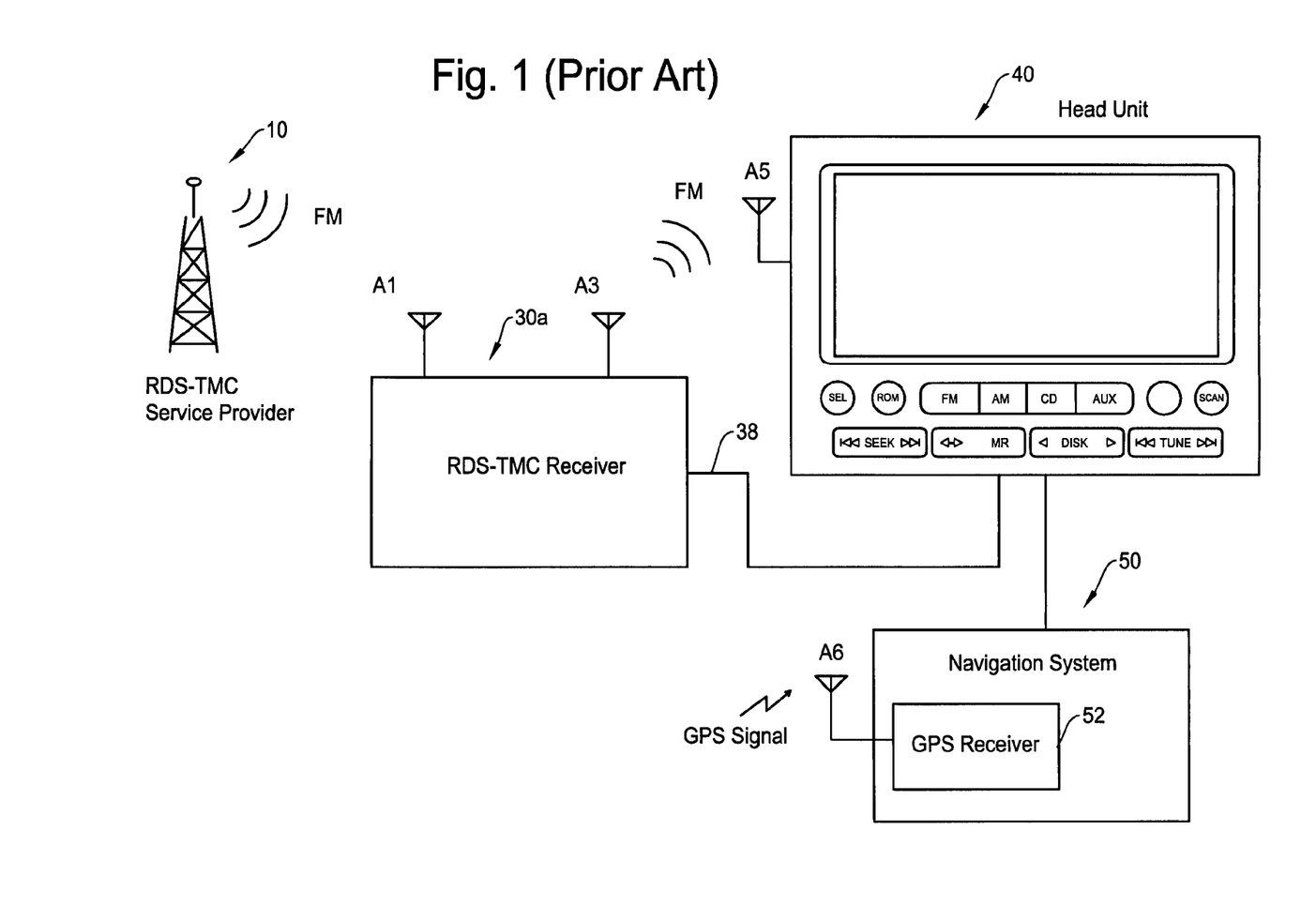
FIG. 1 is a schematic diagram showing an example of system structure having an RDS-TMC receiver and a navigation system both linked to a head unit of an automobile.

FIG. 1 is a schematic diagram showing an example of structure of such a system incorporating the RDS-TMC receiver and the navigation system. In FIG. 1, a head unit 40 is an audio/video system (multimedia terminal) of a vehicle which typically includes an AM/FM radio, CD/DVD player, an LCD monitor screen, etc. A navigation system 50 is connected, typically through cables, to the head unit 40 to display the various functions of the navigation system 50, such as various menus, map images, a calculated route, icons, etc. The navigation system 50 includes a GPS receiver 52 which receives GPS satellite signals through GPS antenna A6 to determine the current position of the vehicle in combination with gyroscopes and speed sensors mounted on the vehicle.

An RDS-TMC receiver 30a is to receive the traffic and travel information contained in an RDS-TMC signal from an RDS-TMC service provider (broadcaster) 10 through wireless transmission. Typically, the RDS-TMC signal is an FM (frequency modulated) signal whose frequency is assigned to a predefined FM channel. As to which particular FM channel is assigned to a particular RDS-TMC signal may vary depending on a particular location, service provider, surrounding communication environment, etc.

The RDS-TMC receiver 30a receives the RDS-TMC signal at an antenna A1 and converts (demodulates) the RDS-TMC signal to an intermediate frequency (IF) signal. The intermediate frequency signal includes coded messages regarding traffic information which is specific to a particular region where the user is located. In the example of FIG. 1, the RDS-TMC receiver 30a decodes the traffic and travel information (RDS-TMC data) and sends the decoded RDS-TMC data to the head unit 40 of the vehicle through a cable 38. Alternatively, the RDS-TMC receiver 30a modulates the decoded RDS-TMC data to produce an FM signal again by an modulator. The FM signal having the decoded traffic and travel information (RDS-TMC data) is transmitted by an antenna A3 of the RDS-TMC receiver 30a to the head unit 40 through an antenna A5.

The head unit 40 produces voice messages or video images indicating the traffic and travel information. The arrangement of the RDS-TMC receiver 30a which is connected to the head unit 40 by the cable 38 is simple although it requires to physically connect the cable 38 therebetween. The arrangement of the RDS-TMC receiver 30a which produces the FM signal to be received by the head unit 40 through the antenna is convenient because a user can enjoy the traffic and travel information service by simply carrying-on the RDS-TMC receiver 30a without physically connecting to the head unit 40.

Figure 2:
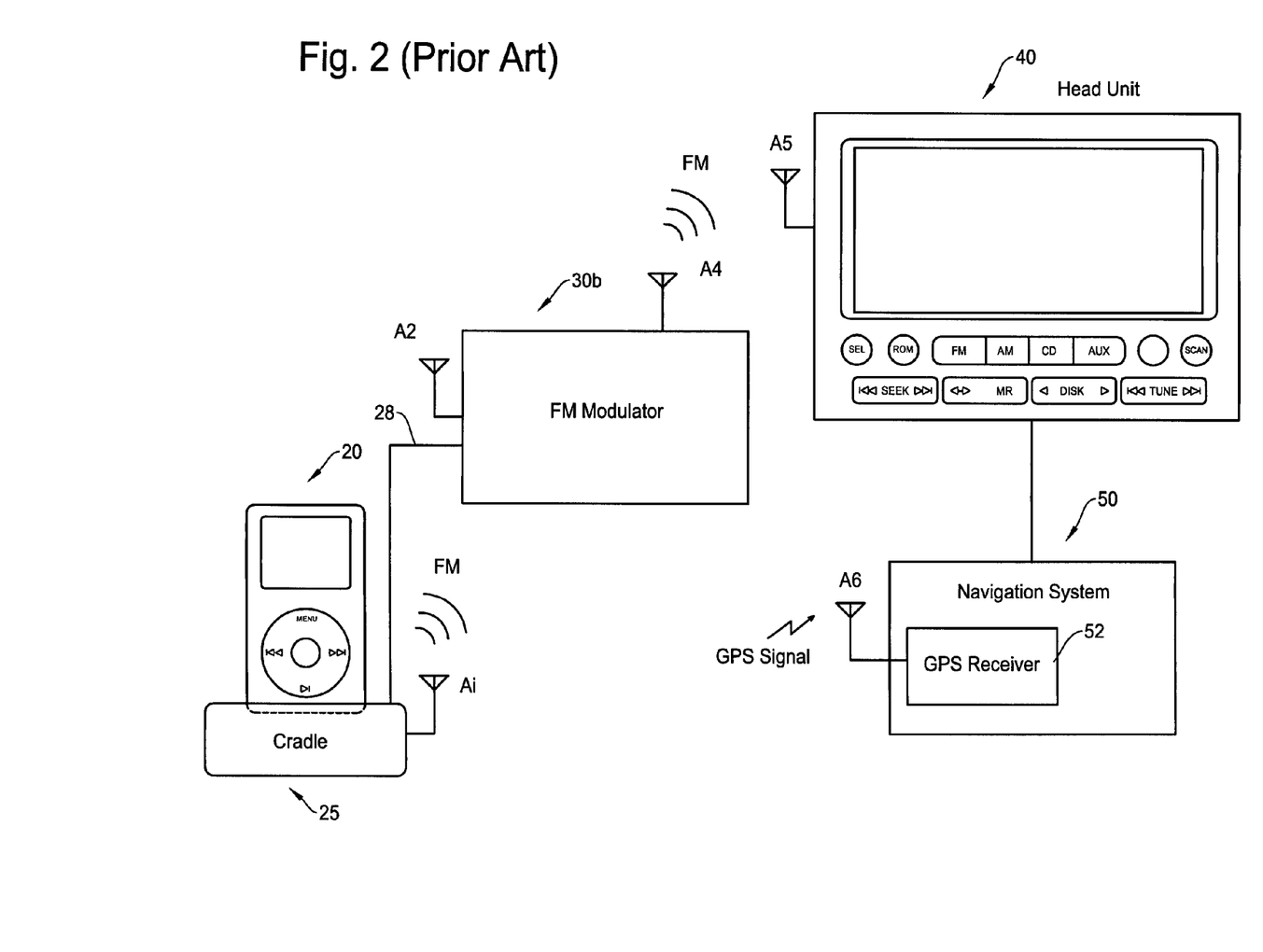
FIG. 2 is a schematic diagram showing an example of system structure having an FM modulator and a navigation system both linked to a head unit of an automobile.

FIG. 2 is a schematic diagram showing an example of structure of a system incorporating an FM modulator in the vehicle. This example shows the case where an FM modulator 30b is used in the vehicle to reproduce the audio sounds by the head unit 40 of the vehicle. The FM modulator 30b receives FM modulated audio signals, etc. from a portable audio device 20 such as an IPOD™ (a portable digital audio/music player by Apple Computer, Inc., California) on a cradle 25 through wireless communication (between antennas A1 and A2). Alternatively, the FM modulator 30b receives audio signals, etc. from the audio device 20 or other device directly through wired communication by connecting a cable 28 therebetween. Examples of other device for use with the FM modulator 30b include a cellular phone, audio book, hand-held computer, PDA, etc.

The FM modulator 30b frequency-modulates the audio signals to transmit the FM modulated audio signals through an antenna A4. The FM modulated audio signals are received by the head unit 40 through the antenna A5 so that a user can enjoy music, audio sounds, etc., by the head unit 40 of the vehicle. The arrangement of FIG. 2 is convenient because a user can enjoy the favorite music, etc., by simply placing the FM modulator 30b in the vehicle without need of physically connecting the audio device 20 (IPOD™) and the FM modulator 30b to the head unit 40.

Figure 3:
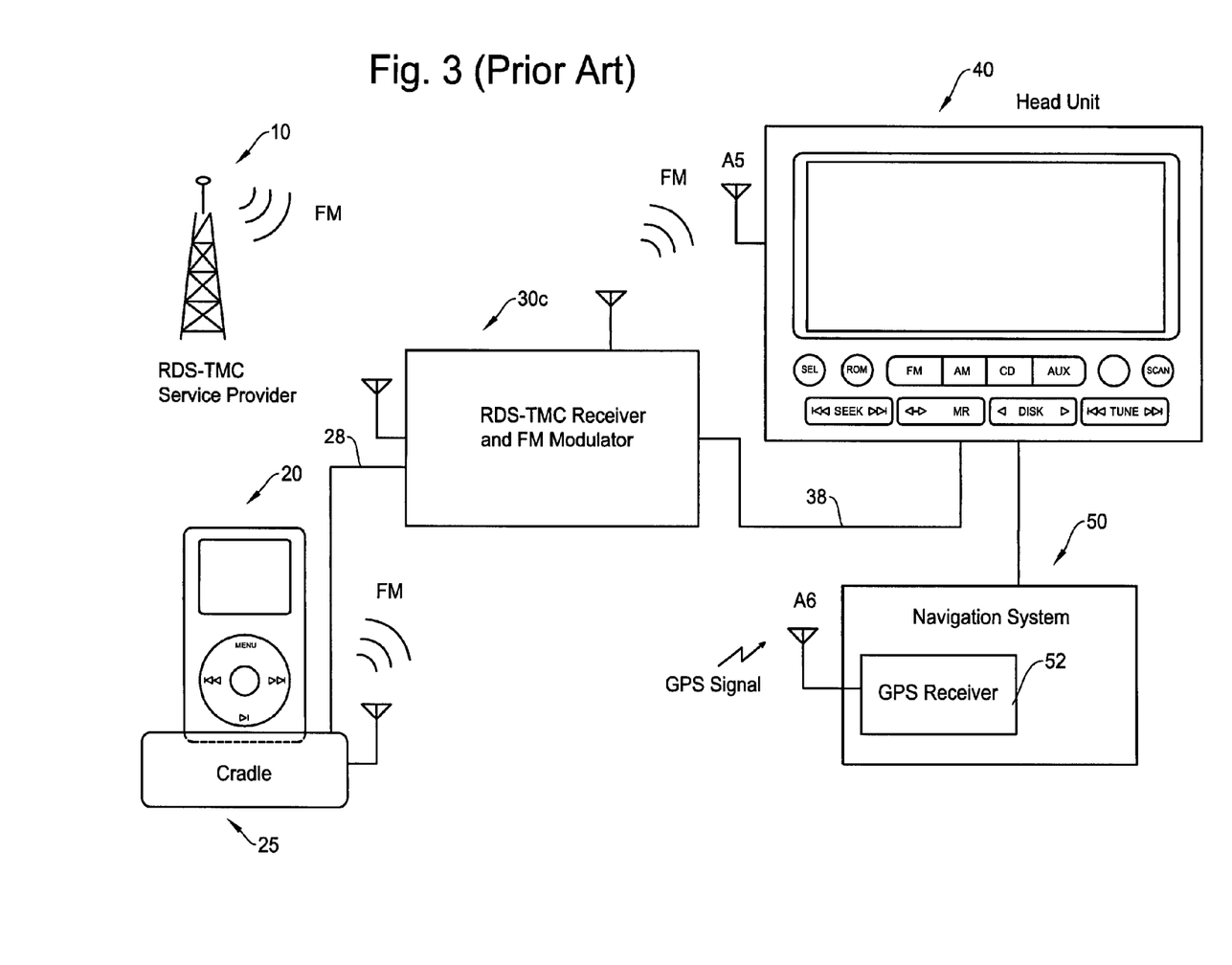
FIG. 3 is a schematic diagram showing an example of system structure having an RDS-TMC receiver, an FM modulator, and a navigation system, all of which are linked to a head unit of an automobile.

FIG. 3 is a schematic diagram showing an example of a receiver system 30c incorporating both the RDS-TMC receiver and the FM modulator in the vehicle. This example shows the case where either one of the RDS-TMC receiver or FM modulator or both thereof are used in combination with the head unit 40 of the vehicle. Each of the RDS-TMC receiver and the FM modulator in the receiver system 30c functions in the same manner as described with reference to FIGS. 1 and 2, respectively.

Figure 4A:
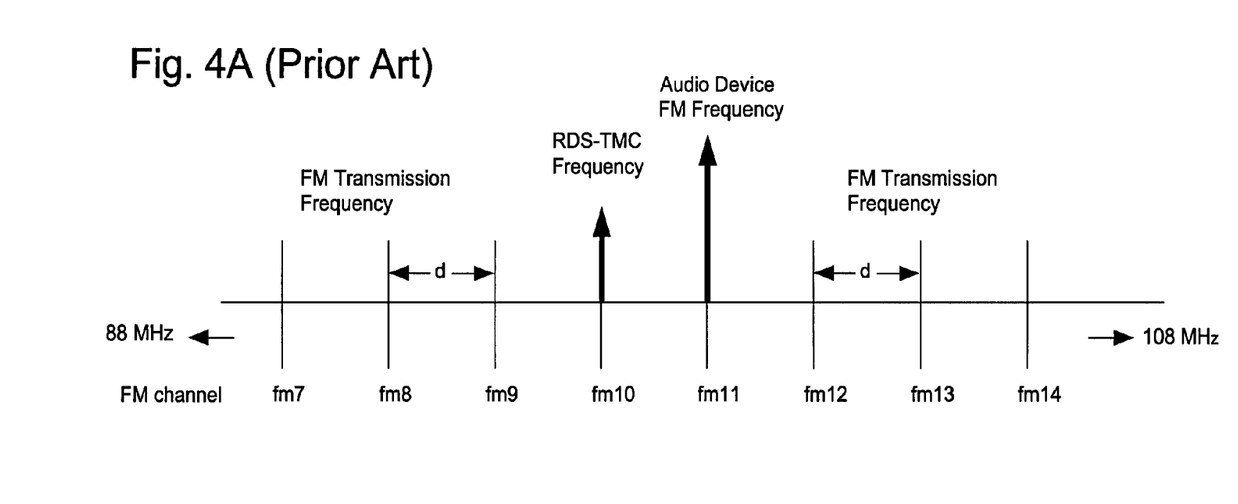
FIGS. 4A and 4B are schematic diagrams showing an example of FM channel arrangement and problems associated with the case when using both the RDS-TMC receiver and the FM modulator at the same time.
Figure 4B:
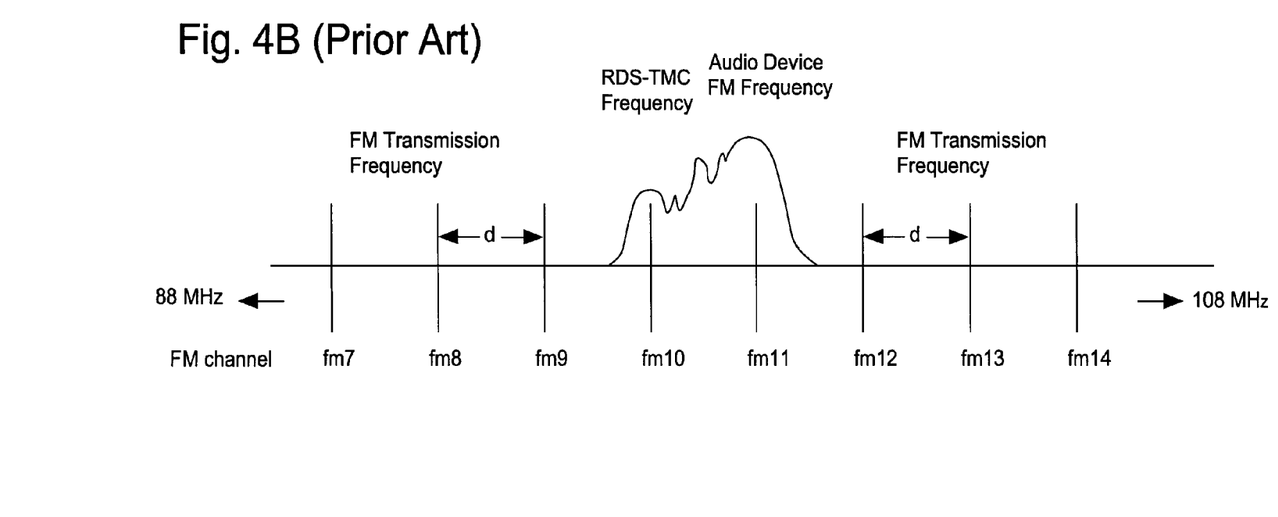

FIGS. 4A and 4B are schematic diagrams showing an example of FM channel arrangement and problems associated with the case where both the RDS-TMC receiver and the FM modulator are operated at the same time. In FIGS. 4A and 4B, FM channels fm7-fm14 are illustrated in which a bandwidth d between the two adjacent channels is 200 kHz. As is well known in the art, such FM channels are established between 88 MHz and 108 MHz in USA. The example of FIGS. 4A and 4B shows the case where the RDS-TMC signals are broadcasted by the service provider 10 through the FM channel fm10 while the FM signals transmitted by the FM modulator for the audio data is in the FM channel fm11.

In other words, the FM channels (frequency bands) for the RDS-TMC transmission and the FM audio transmission are very close to one another. In the worst case scenario, the same channel such as fm10 may be used for both the RDS-TMC transmission and the FM audio transmission. In such a situation, interference may arise between the two signals depending on various conditions, for example, power levels of the signals, surrounding topological situations such as buildings and mountains, weather conditions, etc. Typically, such interference tends to occur between the FM signal from the service provider to be received by the RDS-TMC receiver and the FM signal generated by the FM modulator to be received by the head unit 40. This is because the power level of the FM signal from the output of the FM modulator is much larger than that of the RDS-TMC signal at the input of the RDS-TMC receiver.

FIG. 4B shows such a problem in which frequency spectrum of the FM signal for the RDS-TMC data and frequency the FM signal for the IPOD™ (audio device) audio data are deteriorated because of the interference between the two FM signals. Thus, the traffic and travel information may not be sufficiently extracted from the FM signal from the RDS-TMC service provider. Since it is usually necessary to prioritize the traffic and travel information over the audio sounds, etc., there is a need to more securely receive the RDS-TMC signal when both the RDS-TMC receiver and the FM modulator are used at the same time.

SUMMARY OF THE INVENTION

It is, therefore, an object of the present invention to provide a method and apparatus for securely receiving an FM signal from RDS-TMC service provider by preventing interference between the FM signals when both the RDS-TMC receiver and the FM modulator are used at the same time.

It is another object of the present invention to provide a method and apparatus for securely receiving an FM signal from RDS-TMC service provider by assigning an FM channel for the FM modulator which is sufficiently apart from the FM channel used by the RDS-TMC transmission.

One aspect of the present invention is a method for preventing interference between an FM signal for an RDS-TMC receiver and an FM signal produced by an FM modulator. The method includes the steps of starting an operation of the receiver system, stopping an operation of only the FM modulator, examining whether an RDS-TMC ((Radio Data System-Traffic Message Channel) signal from a service provider is available at a current location, receiving the RDS-TMC signal and retrieving RDS-TMC data therefrom, sending the retrieved RDS-TMC data to an audio/video system, and starting the operation of the FM modulator while allowing to output an FM signal from the FM modulator at allowable frequency bands which are outside of a blocked range to send data to the audio/video system.

The blocked range is a frequency range determined based on a frequency band at which the RDS-TMC signal is transmitted in such a way that the frequency band for the FM signal from the FM modulator is sufficiently apart from the frequency band for the RDS-TMC signal, thereby avoiding any interference therebetween.

The present invention further includes the steps of receiving data, which is audio data, text data, or video data, from a portable device or service station by the FM modulator and frequency-modulating the received data to produce the FM signal at the allowable frequency band, and sending the FM signal from the FM modulator to the audio/video system. In one aspect, the step of receiving the data by the FM modulator includes a step of directly receiving the data through a cable. In another aspect, alternatively, the step of receiving the data by the FM modulator includes a step of receiving an FM signal carrying the data through an antenna, and a step of retrieving the data from the FM signal.

In the present invention, the step of sending the retrieved RDS-TMC data to the audio/video system includes a step of directly providing the retrieved RDS-TMC data to the audio/video system through a cable. Alternatively, the step of sending the retrieved RDS-TMC data to the audio/video system includes a step of frequency-modulating the received RDS-TMC data to produce an FM signal and sending the FM signal from the FM modulator to the audio/video system through an antenna.

In the present invention, the frequency range blocked to be used by the FM modulator includes at least one lower FM channel and one upper FM channel with respect to an FM channel used by the RDS-TMC signal.

Another aspect of the present invention is an apparatus for preventing the interference between an FM signal for an RDS-TMC receiver and an FM signal produced by an FM modulator when both the RDS-TMC receiver and the FM modulator are used at the same time. The apparatus of the present invention is configured by components corresponding to the various steps defined in the method noted above to implement the steps.

According to the present invention, the receiver system is able to securely receive the RDS-TMC signal and allows the user to select a frequency band for FM transmission by the FM modulator which is sufficiently apart from the frequency band used for the RDS-TMC transmission. In the present invention, the receiver system prioritizes an operation for receiving the RDS-TMC signal over receiving other FM signals by blocking the FM transmission at a frequency band close to the frequency used for the RDS-TMC transmission. By using the FM channels whose frequencies are apart more than the predetermined range, both the RDS-TMC signal (for traffic information) and the FM signal (for audio and video data, text data, etc.) can be received at the same time without interference.

DETAILED DESCRIPTION OF THE PREFERRED EMBODIMENT

The present invention will be described in detail with reference to the accompanying drawings. The method and apparatus of the present invention is designed to securely receive the RDS-TMC signal and allows the user to select a frequency band for FM transmission which is sufficiently apart from the frequency band used for the RDS-TMC transmission. It should be noted that although the present invention is described in the following for the case where the receiver system is used in a vehicle in combination with a head unit (multimedia terminal) of the vehicle, the application of present invention is not limited to the vehicle but can be applied to many other situations where both the RDS-TMC transmission and the FM transmission are involved.

In the present invention, the receiver system prioritizes an operation for receiving the RDS-TMC signal over receiving other FM signals by blocking the FM transmission at a frequency band close to the frequency used for the RDS-TMC transmission. For example, when receiving the RDS-TMC signal, the receiver system forbids the user to select the FM channels immediately adjacent to the FM channel used by the RDS-TMC transmission. By using the FM channels whose frequencies are apart more than the predetermined range (blocked range), both the RDS-TMC signal (for traffic information) and the FM signal (for audio and video data, text data, etc.) can be transmitted and received at the same time without interference.

Figure 5A:
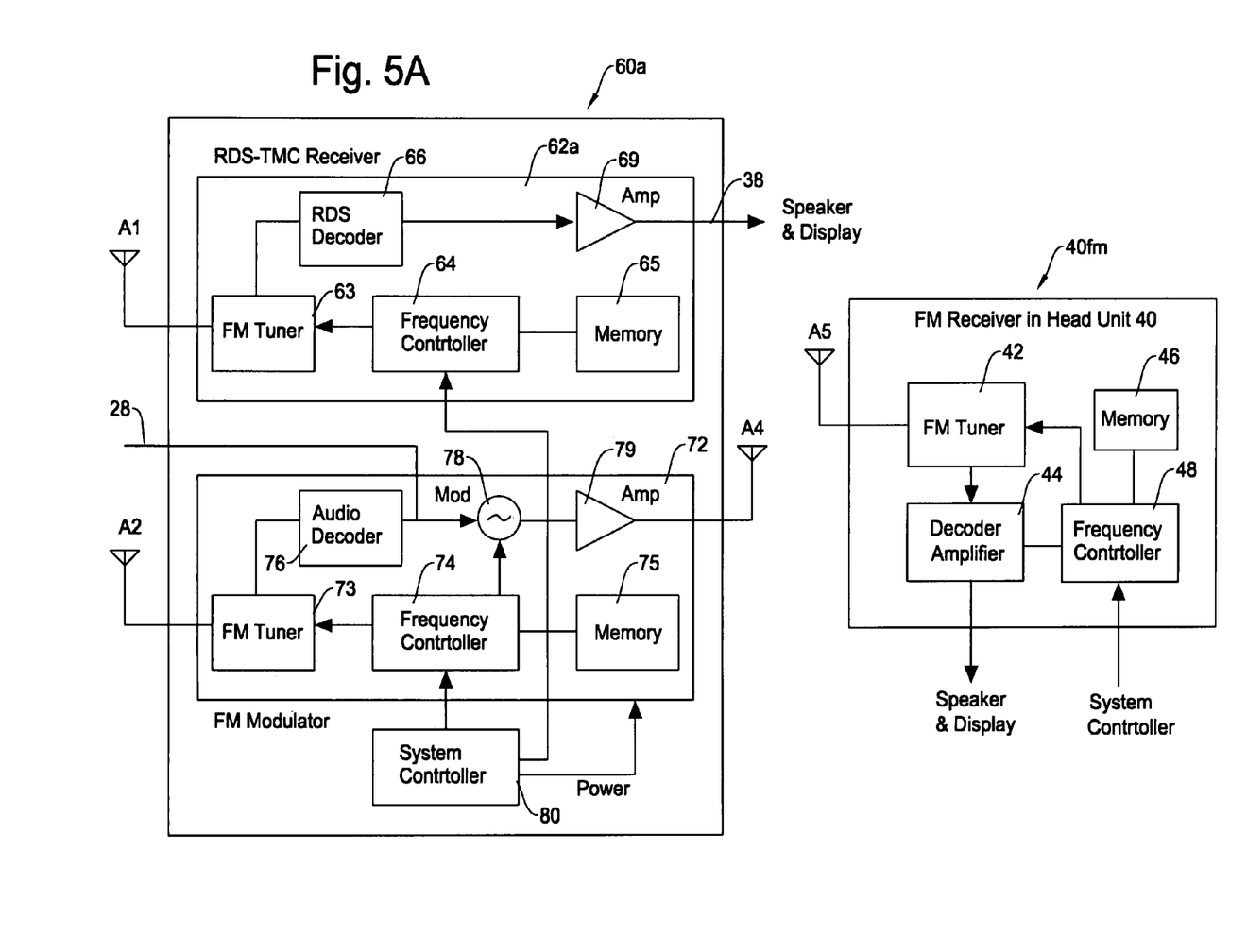
FIGS. 5A and 5B are block diagrams showing examples of structure of the receiver system having both the RDS-TMC receiver and the FM modulator to securely receive the RDS-TMC signal in accordance with the present invention.
Figure 5B:
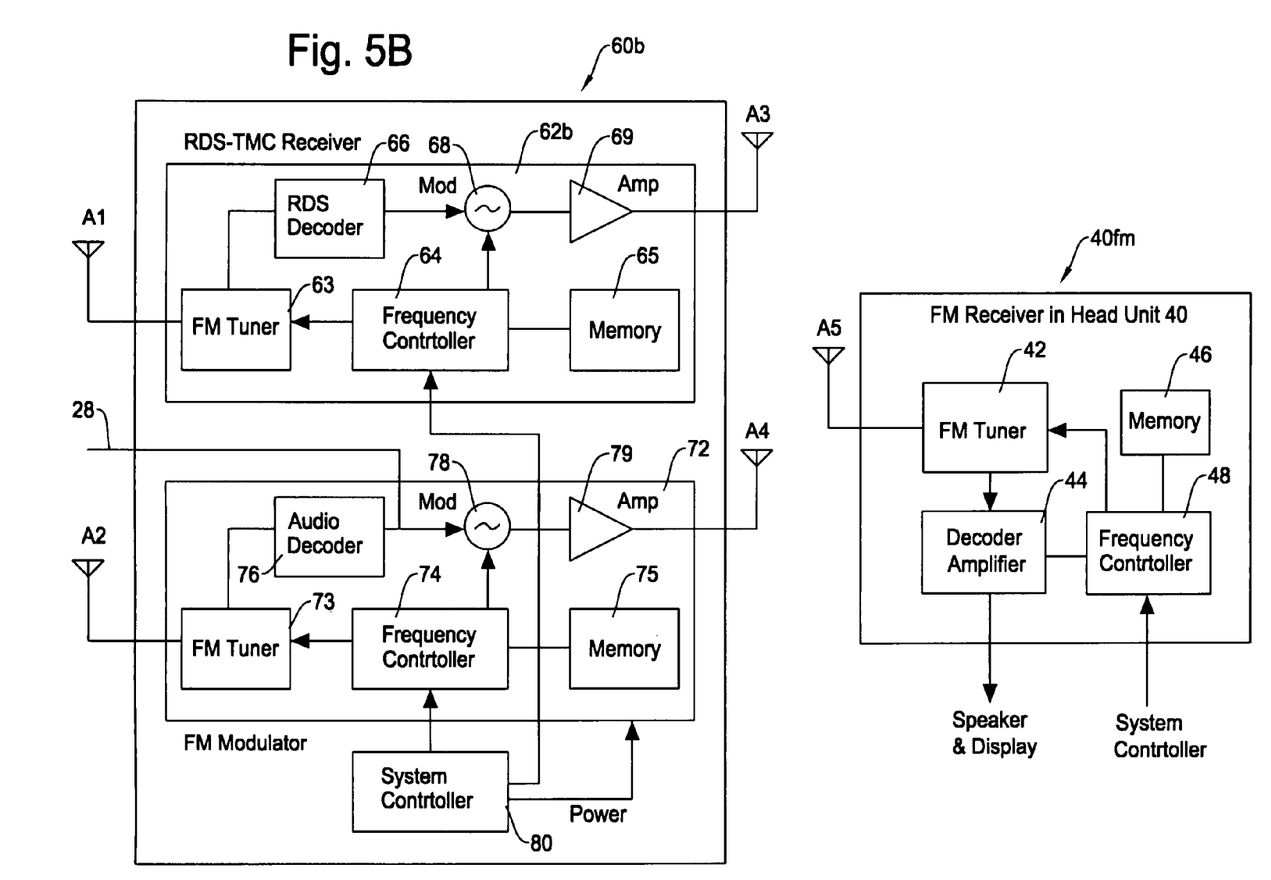

FIGS. 5A and 5B are block diagrams showing examples of structure of the receiver system of the present invention having both the RDS-TMC receiver and the FM modulator. The receiver system 60 is designed to securely receive the RDS-TMC signal by blocking one or more FM channels immediately adjacent to the FM channel assigned to the RDS-TMC transmission so that the FM modulator has to use the FM channels other than the blocked channels. In FIG. 5A, the receiver system 60a includes an RDS-TMC receiver which directly sends the decoded RDS-TMC data to the head unit (audio/video system or multimedia terminal) 40 through wired communication, and in FIG. 5B, the receiver system 60b includes an RDS-TMC receiver which frequency-modulates the decoded RDS-TMC data and sends the data to the head unit 40 through wireless communication.

In the example of FIG. 5A, the receiver system 60a includes an RDS-TMC receiver 62a, an FM modulator 72, and a system controller 80 where the RDS-TMC receiver 62a directly sends the RDS-TMC data to the head unit 40 through a cable 38. In the example of FIG. 5B, the receiver system 60b includes an RDS-TMC receiver 62b, an FM modulator 72, and a system controller 80 where the RDS-TMC receiver 62a modulates the RDS-TMC data and sends the FM signal of the RDS-TMC data to the head unit 40 through an antenna A3. Each example of FIGS. 5A and 5B further shows an FM receiver 40fm which is a part of the head unit 40 (FIGS. 1-3) in the vehicle to receive the FM signal and/or coded data, thereby producing the audio sounds and video images.

The RDS-TMC receiver 62a or 62b is to receive the FM signal from the RDS-TMC service provider 10 (FIGS. 1 and 3) through the antenna A1 and retrieves the traffic and travel information (RDS-TMC data) in the FM signal. Then, the RDS-TMC receiver 62a in FIG. 5A outputs the retrieved RDS-TMC data to the head unit 40 via the cable 38. Alternatively, the RDS-TMC receiver 62b in FIG. 5B modulates the retrieved RDS-TMC data (traffic and travel information) to produce an FM signal again with a selected carrier frequency (FM channel). The RDS-TMC receiver 62b transmits the FM signal through the antenna A3. The head unit 40 reproduces the traffic and travel information through the speaker and monitor screen.

The RDS-TMC receiver 62a in FIG. 5A includes an FM tuner 63 for detecting an intermediate frequency (IF) signal in the FM signal received through the antenna A1, an RDS-TMC decoder 66 for extracting RDS-TMC data (traffic and travel information) from the intermediate frequency signal, a frequency controller 64 for producing carrier frequency signals based on information received from a memory 65, and an amplifier 69 for amplifying the decoded RDS-TMC data. The RDS-TMC receiver 62b in FIG. 5B additionally includes a modulator 68 for frequency modulating the decoded data from the RDS decoder 66 where the amplifier 69 amplifies the FM signal from the modulator 68 to transmit the FM signal through the antenna A3.

The frequency controller 64 provides a selected carrier frequency signal to the FM tuner 63. In the case of the RDS-TMC receiver 62b in FIG. 5B, the frequency controller 64 also provides a selected carrier frequency signal to the modulator 68 so that the modulator 68 frequency-modulates the RDS-TMC data. The system controller 80 controls an overall operation of the receiver system 60 and sends command signals to the frequency controller 64 to select the carrier frequencies that should be applied to the FM tuner 63 and to the modulator 68.

The FM modulator 72 is to retrieve data such as music data from a portable audio device such as IPOD™ (FIGS. 2 and 3) or other device. Examples of other device for use with the FM modulator 72 include a cellular phone, audio book, hand-held computer, PDA, FM service station or broadcaster, etc., that produce audio, text, or video data. The audio data, text data, video data (hereafter collectively "audio data") may be included in the FM signal received through an antenna A2 so that the FM modulator 72 retrieves the audio data in the FM signal. Alternatively, such audio data may be directly transferred to the FM modulator 72 through the cable 28 connected to the audio device. Then, the FM modulator 72 modulates (frequency-modulates) the audio data to produce an FM signal again with a selected carrier frequency (FM channel). The FM modulator 72 transmits the FM signal through the antenna A4 to that the head unit 40 receives and reproduces the audio data.

In either FIG. 5A or 5B, the FM modulator 72 includes an FM tuner 73 for detecting an intermediate frequency (IF) signal in the FM signal received through the antenna A2, an audio decoder 76 for extracting audio data from the intermediate frequency signal, a frequency controller 74 for producing carrier frequency signals based on information received from a memory 75, a modulator 78 for frequency-modulating the decoded data from the audio decoder 76, an amplifier 79 for amplifying the FM signal from the modulator 78 to transmit the FM signal through the antenna A4. The frequency controller 74 provides, in response to the system controller 80, the selected carrier frequency signals to the FM tuner 73 and the modulator 78.

The system controller 80 controls an overall operation of the receiver system 60 and sends command signals to the frequency controller 74 to select the carrier frequencies that should be applied to the FM tuner 73 and to the modulator 78. Especially, when the RDS-TMC receiver 62a or 62b receives the FM signal from the RDS-TMC service provider 10, the system controller 80 stops the FM transmission by the FM modulator 72 by, for example, turning off the power of the FM modulator 72 so that the RDS-TMC receiver is able to receive the FM signal accurately. Then, the system controller 80 turns on the FM modulator 72 to produce the FM signal for the audio data at a carrier frequency (FM channel) which is separated more than a predetermined range from the FM channel used by the RDS-TMC transmission. It is also possible to use other methods to stop the FM transmission by the FM modulator 72, for example, by not supplying the carrier signal from the frequency controller 74 to the modulator 78.

The FM receiver 40*fm* receives the FM signals from the receiver system 60*a* or 60*b* through the antenna A5. The FM receiver 40*fm* retrieves the traffic and travel information from FM signal from the RDS-TMC receiver 62*b* and/or the audio data from the FM signal from the FM modulator 72. In the case of FIG. 5A, the RDS-TMC data without modulation from the RDS-TMC receiver 62*b* is directly supplied to the head unit 40 via the cable 38. The traffic and travel information (RDS-TMC data) and/or the audio sound may be reproduced by the speaker and monitor screen of the head unit 40 of the vehicle.

The FM receiver 40*fm* includes an FM tuner 42 for detecting an intermediate frequency (IF) signal in the FM signal received through the antenna A5, a decoder/amplifier 44 for extracting traffic and travel information (RDS-TMC data) and/or the audio data from the intermediate frequency signal, and a frequency controller 48 for producing carrier frequency signals based on information received from a memory 46. The frequency controller 48 provides the selected carrier frequency signal to the FM tuner 42 based on instructions from a system controller (not shown). The FM receiver 40*fm* sends the extracted traffic and travel information (RDS-TMC data) and/or the audio data to the speaker and monitor screen to reproduce the audio sounds and images involved in the traffic information, etc.

Figure 6:
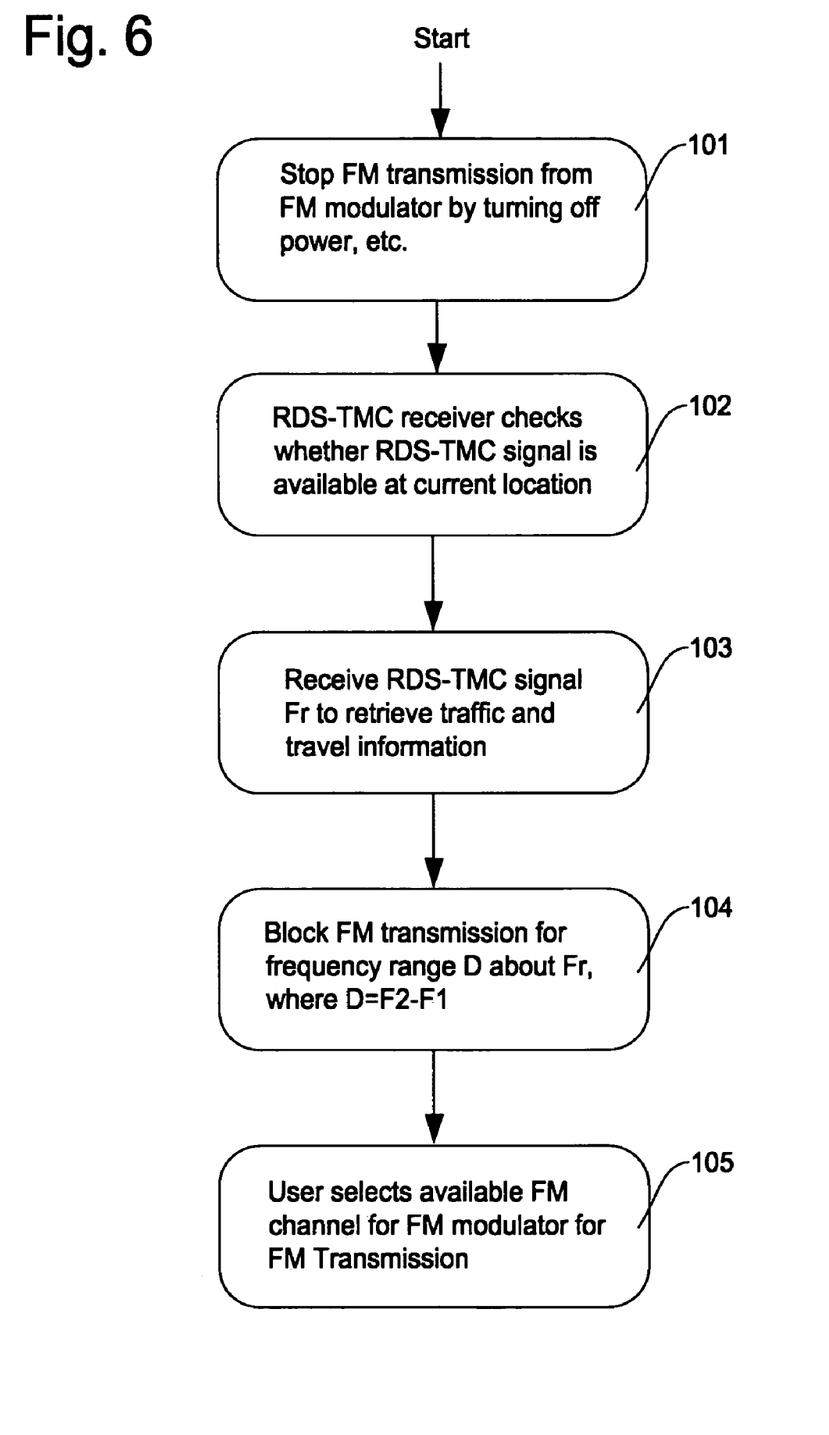
FIG. 6 is a flow chart showing an example of basic operation of the receiver system in accordance with the present invention.

FIG. 6 is a flow chart showing an example of basic operational process of the method and apparatus (receiver system) in accordance with the present invention. As noted above, the present invention is designed to securely receive the RDS-TMC signal by blocking FM channels close to the FM channel where the RDS-TMC signal is transmitted. The method of the present invention allows the user to select an FM channel for FM transmission for data other than the RDS-TMC where the frequency of the allowable channel is outside of the blocked range, i.e., sufficiently apart from the frequency band used for the RDS-TMC transmission.

In the example of FIG. 6, when the receiver system 60 is in operation, the process of the present invention stops the FM transmission from the FM modulator 72, at step 101, while keeps operating the RDS-TMC receiver 62. The system controller 80 of FIGS. 5A-5B controls to stop the FM transmission from the FM modulator 72 by turning off the power of the FM modulator 72. As noted above, it is also possible to stop the FM transmission by the FM modulator 72 by other means, for example, by not supplying the carrier signal from the frequency controller 74 to the modulator 78, thereby preventing to produce the FM signals.

In step 102, the RDS-TMC receiver checks whether the RDS-TMC signal is available at the current location. For this purpose, the system controller 80 in FIGS. 5A-5B instructs the frequency controller 64 to change the frequency of the carrier signal for the FM tuner 63. Since the FM transmission by the FM modulator 72 is not conducted, it is possible to accurately check whether the RDS-TMC signal is available. It should be noted that the process of step 101 and 102 noted above can be reversed, i.e., checks the availability of the RDS-TMC signal first, and then stops the FM transmission by the FM modulator 72. This is applicable to a case where an operation for checking the availability of RDS-TMC signal itself can be done even when there is interference between the FM signals.

In step 103, the RDS-TMC receiver 62*a* or 62*b* receives the FM signal from the RDS-TMC service provider by adjusting the carrier frequency produced by the frequency controller 64 for the FM tuner 63. As noted above, since an FM channel used for the RDS-TMC transmission may vary depending on the particular location and service provider, the system controller instructs the frequency controller 64 to adjust the carrier frequency to tune the FM tuner, thereby detecting an intermediate frequency (IF) signal. The RDS-TMC receiver 62*a* or 62*b* retrieves the RDS-TMC data by decoding the intermediate frequency signal from the FM tuner 63 (FIGS. 5A-5B) by the RDS decoder 66. Since the FM modulator 72 will not produce any FM signal, the FM signal for the RDS-TMC receiver 62*a* or 62*b* will not be interfered by other FM signal.

The decoded RDS-TMC data (traffic and travel information) is directly supplied to the head unit 40 through the connection cable 38 in the example of FIG. 5A. Alternatively, the decoded RDS-TMC data (traffic and travel information) is frequency-modulated (FM) again by the modulator 68 in the example of FIG. 5B and the FM signal is transmitted to the head unit 40 through the antenna A3. In the present invention, at step 104, to securely receive the RDS-TMC FM signal without the interference between two or more adjacent FM signals, the frequency band (FM channel) for the FM transmission by the FM modulator 72 is limited to the ranges outside of the predetermined frequency range D (FIGS. 7A and 7B) that is determined with respect to the RDS-TMC transmission.

For example, when receiving the RDS-TMC signal, the receiver system 60*a* or 60*b* forbids the FM modulator 72 to use the range between FM frequencies F1 and F2 (lower FM channel fm9 and upper FM channel fm11) immediately adjacent to the FM frequency Fr (FM channel fm10) used by the RDS-TMC transmission. Thus, in this example, the predetermined prohibited frequency range D extends between the frequency F1 and the frequency F2 of FIGS. 7A and 7B, namely, D=F2−F1. It is also possible to block a more wider frequency range of the FM channel, for example, two times of the above frequency range D. Accordingly, in step 105, the user selects the available FM channel for the FM transmission by the FM modulator 72 after turning on the power of the FM modulator 72 manually or automatically by the system controller 80. Since the available FM channel for the FM modulator 72 is sufficiently apart from the FM channel used for receiving the RDS-TMC signal by the RDS-TMC receiver, both the FM modulator and the RDS-TMC receiver operate without interference.

Figure 7A:
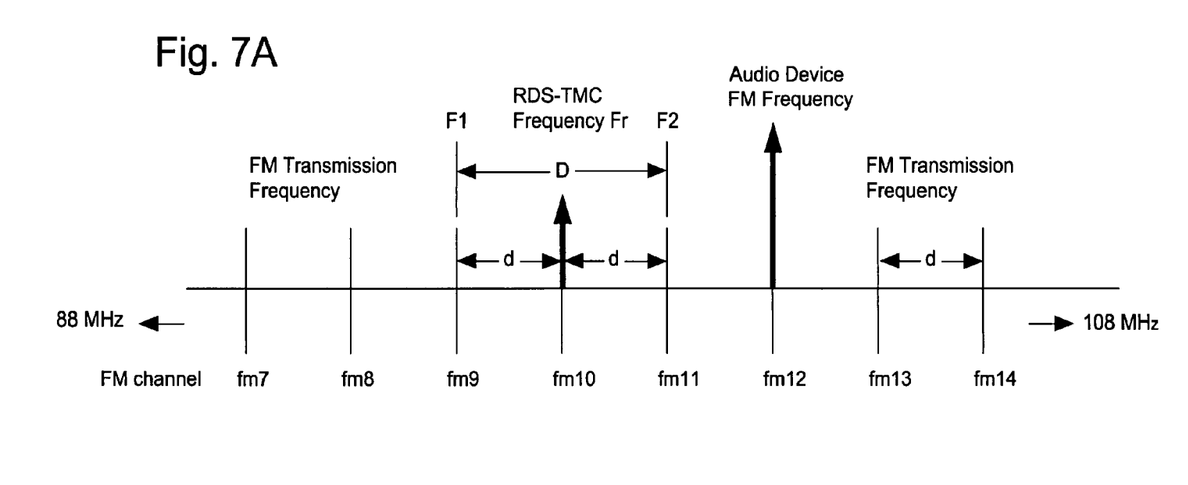
FIGS. 7A and 7B are schematic diagrams showing an example of FM channel arrangement corresponding to that of FIGS. 4A and 4B where the problems associated with using both the RDS-TMC receiver and the FM modulator at the same time are resolved in the present invention.
Figure 7B:
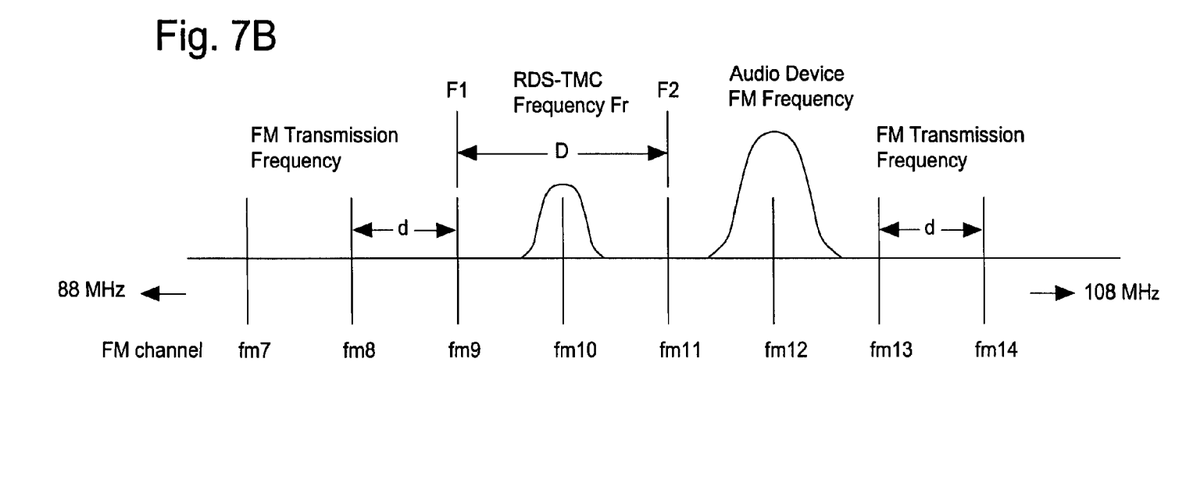

FIGS. 7A and 7B are schematic diagrams showing an example of FM channel arrangement corresponding to that of FIGS. 4A and 4B where both the RDS-TMC receiver and the FM modulator are used at the same time. In FIGS. 7A and 7B, the problems associated with such a situation are resolved in the present invention. Similar to FIGS. 4A and 4B, FM channels fm7-fm14 are illustrated in which a bandwidth d between the two adjacent channels is 200 kHz and such FM channels are established between 88 MHz and 108 MHz in USA. The example of FIGS. 7A and 7B shows the case where the RDS-TMC signals are broadcasted by the service provider 10 through the FM channel fm10 and the FM channels fm9 and fm11, that are within the range D, are prohibited to use by the FM modulator 72. Thus, in this example, the FM signal (IPOD™/audio device FM frequency) transmitted by the FM modulator 72 for the audio data is in the FM channel fm12.

In other words, there is at least one upper or lower FM channel (fm9, fm11) which is not used by the FM modulator apart from the FM channel (fm10) used for the RDS-TMC transmission. It is also possible to block two or more FM from the FM channel (fm10) used for the RDS-TMC transmission. Accordingly, there exists a sufficient difference in the carrier frequency (FM channel) between the FM channel for the FM modulator and the FM channel for the RDS-TMC receiver. Therefore, the frequency spectrum for the FM modulator 72 and the frequency spectrum for the RDS-TMC receiver 62a or 62b are not deformed (interfered) with one another as shown in FIG. 7B.

As has been described above, according to the present invention, the receiver system is able to securely receive the RDS-TMC signal and allows the user to select a frequency band for FM transmission by the FM modulator which is sufficiently apart from the frequency band used for the RDS-TMC transmission. In the present invention, the receiver system prioritizes an operation for receiving the RDS-TMC signal over receiving other FM signals by blocking the FM transmission at a frequency band close to the frequency used for the RDS-TMC transmission. By using the FM channels whose frequencies are apart more than the predetermined range, both the RDS-TMC signal (for traffic information) and the FM signal (for audio and video data, text data, etc.) can be received at the same time without interference.

Although the invention is described herein with reference to the preferred embodiment, one skilled in the art will readily appreciate that various modifications and variations may be made without departing from the spirit and scope of the present invention. Such modifications and variations are considered to be within the purview and scope of the appended claims and their equivalents.

What is claimed is:

1. A method of operating a receiver system having both an RDS-TMC receiver and an FM modulator, comprising the following steps of:
    starting an operation of the receiver system;
    stopping an operation of the FM modulator while continuously operating the RDS-TMC receiver;
    examining whether an RDS-TMC ((Radio Data System-Traffic Message Channel) signal from a service provider is available at a current location;
    receiving the RDS-TMC signal and retrieving RDS-TMC data therefrom;
    sending the retrieved RDS-TMC data to an audio/video system; and
    starting the operation of the FM modulator while allowing to output an FM signal from the FM modulator at allowable frequency bands which are outside of a blocked range to send data to the audio/video system;
    wherein said blocked range is a frequency range determined based on a frequency band at which the RDS-TMC signal is transmitted in such a way that the frequency band for the FM signal from the FM modulator is sufficiently apart from the frequency band for the RDS-TMC signal, thereby avoiding any interference therebetween.

2. A method of operating a receiver system as defined in claim 1, further comprising the steps of:
    receiving data from a device or service station by the FM modulator and frequency-modulating the received data to produce the FM signal at said allowable frequency band; and
    sending the FM signal from the FM modulator to the audio/video system.

3. A method of operating a receiver system as defined in claim 2, wherein said step of receiving said data by the FM modulator includes a step of directly receiving said data through a cable.

4. A method of operating a receiver system as defined in claim 2, wherein said step of receiving said data by the FM modulator includes a step of receiving an FM signal carrying said data through an antenna, and a step of retrieving said data from the FM signal.

5. A method of operating a receiver system as defined in claim 2, wherein said data received by the FM modulator is audio data, text data, or video data.

6. A method of operating a receiver system as defined in claim 1, wherein said step of stopping the operation of the FM modulator includes a step of turning off power of the FM modulator.

7. A method of operating a receiver system as defined in claim 1, said step of sending the retrieved RDS-TMC data to the audio/video system includes a step of directly providing the retrieved RDS-TMC data to the audio/video system through a cable.

8. A method of operating a receiver system as defined in claim 1, said step of sending the retrieved RDS-TMC data to the audio/video system includes a step of frequency-modulating the received RDS-TMC data to produce an FM signal by a modulator within the RDS-TMC receiver and sending the FM signal to the audio/video system through an antenna.

9. A method of operating a receiver system as defined in claim 1, wherein said frequency range blocked to be used by the FM modulator includes at least one lower FM channel and/or one upper FM channel with respect to an FM channel used by the RDS-TMC signal.

10. An apparatus for operating a receiver system having both an RDS-TMC receiver and an FM modulator, comprising:
    means for starting an operation of the receiver system;
    means for stopping an operation of the FM modulator while continuously operating the RDS-TMC receiver;
    means for examining whether an RDS-TMC ((Radio Data System-Traffic Message Channel) signal from a service provider is available at a current location;
    means for receiving the RDS-TMC signal and retrieving RDS-TMC data therefrom;
    means for sending the retrieved RDS-TMC data to an audio/video system; and
    means for starting the operation of the FM modulator while allowing to output an FM signal from the FM modulator at allowable frequency bands which are outside of a blocked range to send data to the audio/video system;
    wherein said blocked range is a frequency range determined based on a frequency band at which the RDS-TMC signal is transmitted in such a way that the frequency band for the FM signal from the FM modulator is sufficiently apart from the frequency band for the RDS-TMC signal, thereby avoiding any interference therebetween.

11. An apparatus for operating a receiver system as defined in claim 10, further comprising:
    means for receiving data from a device or service station by the FM modulator and frequency-modulating the received data to produce the FM signal at said allowable frequency band; and
    means for sending the FM signal from the FM modulator to the audio/video system.

12. An apparatus for operating a receiver system as defined in claim 11, wherein said means for receiving said data by the FM modulator includes means for directly receiving said data through a cable.

13. An apparatus for operating a receiver system as defined in claim 11, wherein said means for receiving said data by the FM modulator includes means for receiving an FM signal carrying said data through an antenna, and means for retrieving said data from the FM signal.

14. An apparatus for operating a receiver system as defined in claim 11, wherein said data received by the FM modulator is audio data, text data, or video data.

15. An apparatus for operating a receiver system as defined in claim 10, wherein said means for stopping the operation of the FM modulator includes means for turning off power of the FM modulator.

16. An apparatus for operating a receiver system as defined in claim 10, said means for sending the retrieved RDS-TMC data to the audio/video system includes means for directly providing the retrieved RDS-TMC data to the audio/video system through a cable.

17. An apparatus for operating a receiver system as defined in claim 10, said means for sending the retrieved RDS-TMC data to the audio/video system includes means for frequency-modulating the received RDS-TMC data to produce an FM signal by a modulator within the RDS-TMC receiver and sending the FM signal to the audio/video system through an antenna.

18. An apparatus for operating a receiver system as defined in claim 10, wherein said frequency range blocked to be used by the FM modulator includes at least one lower FM channel and/or one upper FM channel with respect to an FM channel used by the RDS-TMC signal.

* * * * *